UNITED STATES PATENT OFFICE.

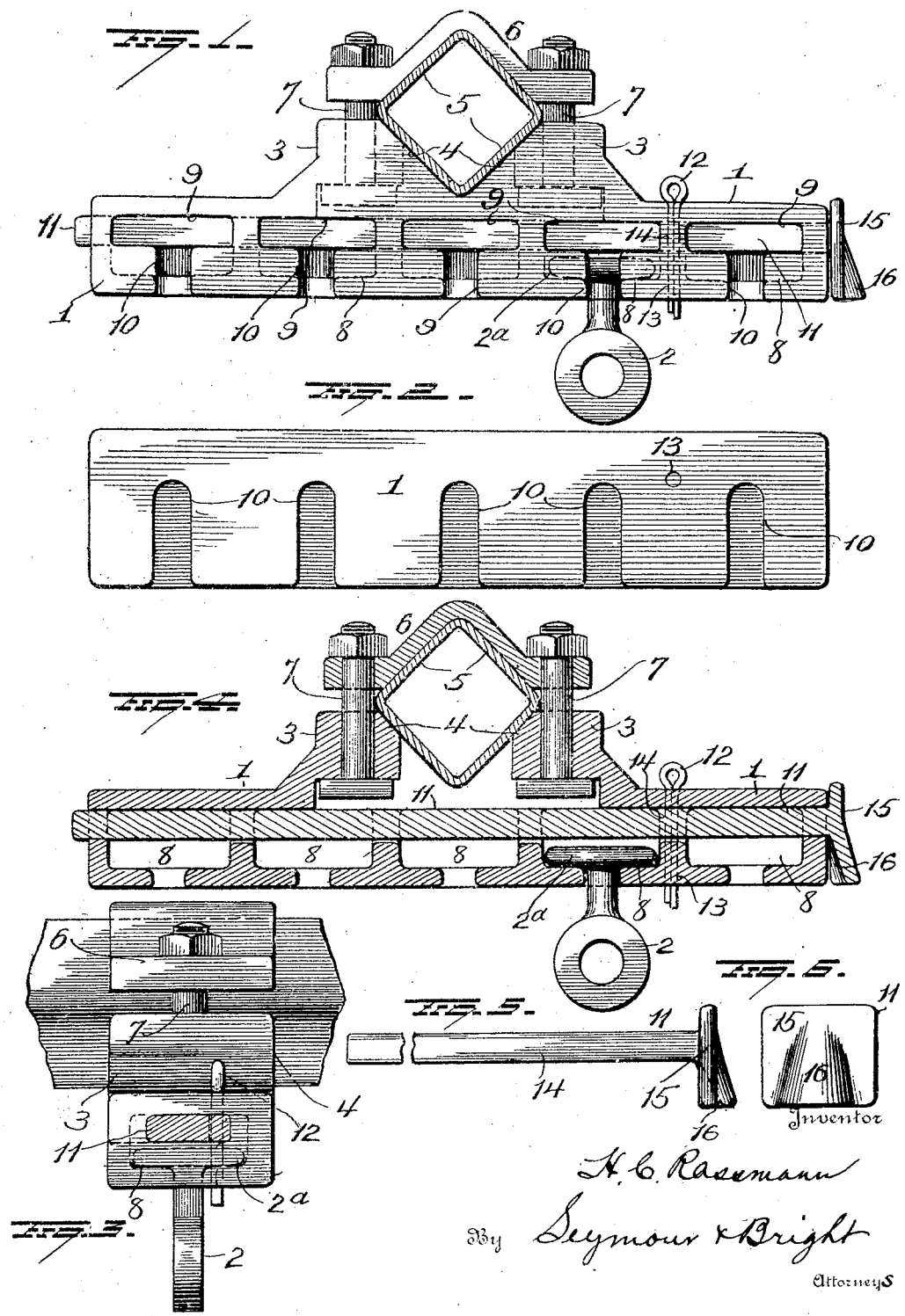

HUGO C. RASSMANN, OF BEAVER DAM, WISCONSIN, ASSIGNOR TO F. RASSMANN MANUFACTURING COMPANY, OF BEAVER DAM, WISCONSIN.

SUPPORTING AND ALIGNING MEANS FOR STANCHIONS.

1,404,057.　　　Specification of Letters Patent.　　Patented Jan. 17, 1922.

Application filed September 16, 1921. Serial No. 501,146.

*To all whom it may concern:*

Be it known that I, HUGO C. RASSMANN, a citizen of the United States, and a resident of Beaver Dam, in the county of Dodge and State of Wisconsin, have invented certain new and useful Improvements in Supporting and Aligning Means for Stanchions; and I do hereby declare the following to be a full, clear, and exact description of the invention, such as will enable others skilled in the art to which it appertains to make and use the same.

This invention relates to improvements in supporting and aligning means for stanchions,—one object of the invention being to provide simple and efficient stanchion supporting and adjusting means which will permit the stanchion to be quickly adjusted for aligning the cattle in a stall, without the necessity of removing nuts or bolts to permit such adjustment.

With this and other objects in view, the invention consists in certain novel features of construction and combinations of parts as hereinafter set forth and pointed out in the claims.

In the accompanying drawings, Figure 1 is a view in side elevation of the device. Figure 2 is a bottom plan view. Figure 3 is an end view. Figure 4 is a sectional view, and Figures 5 and 6 are detail views.

My improvements comprise an elongated bracket or support 1 provided with means whereby the swivel 2 of a stanchion may be adjustably connected therewith and held in place. Bracket 1 is provided with an enlargement 3 having a seat 4 for the accommodation of a stall bar 5. A clamping plate 6 is disposed over the stall bar and formed with a suitable seat for the latter and secured by means of bolts 7 to the enlargement 3 of the bracket.

The bracket or support 1 is made hollow and formed interiorly with a row or series of sockets 8, anyone of which is adapted to receive the head 2ª of the swivel 2. The hollow bracket 1 is provided with a series of lateral openings 9 and the bottom portion of the bracket is provided with lateral slots 10, so that in connecting a swivel with the bracket, the head portion 2ª of the swivel may be passed through any one of the lateral openings 9 and the shank portion of said swivel passed through the underlying slot 10 until the head 2ª becomes disposed over one of the sockets when it will drop into the latter and thus effectually connect the stanchion with said bracket or support. It is evident that the connection of the stanchion or support with the bracket may be adjusted to effect proper alignment of the cattle by removing the swivel laterally from one socket and inserting it in another socket. In order to prevent possibility of escape of the swivel from the socket in which its head may be disposed, I provide a locking bar 11 which passes longitudinally through the bracket 1 so as to be disposed over the various sockets and over the swivel head which may be located in any one of said sockets. To prevent longitudinal displacement of the locking bar, I provide a pin 12 which is passed through suitable holes 13 and through a hole 14 in said locking bar. The locking bar 11 is provided at one end with a head 15 and the lower portion of this head is made with a beveled recess 16 to permit ready insertion of a finger of the operator to facilitate withdrawal of said locking bar when it is desired to adjust the swivel from one socket in the bracket 1 to another.

Having fully described my invention what I claim as new and desire to secure by Letters-Patent, is:—

1. In supporting means for stanchions, the combination of a hollow bracket having therein a row of sockets and having lateral openings to permit access of a swivel head to enter any one of said sockets, said bracket also having lateral slots underlying said openings for the passage of a swivel shank, and a locking means through said bracket so as to be disposed over the sockets therein.

2. In supporting means for stanchions, the combination of a hollow bracket having therein a row of sockets and having lateral openings to permit access of a swivel head to enter any one of said sockets, said bracket also having lateral slots underlying said openings for the passage of a swivel shank, and a locking bar movable longitudinally through said bracket so as to be disposed over the sockets therein.

3. In supporting means for stanchions, the combination of a hollow bracket provided therein with a row of sockets and having lateral slots and openings for the insertion of a stanchion swivel to have its head seated in any one of said sockets, a removable locking bar passing through said bracket so as to be disposed over the sockets therein, and a removable pin passing through the bracket and through the locking bar.

4. In supporting means for stanchions, the combination of a hollow bracket provided therein with a row of sockets and having a lateral slot and an opening for each socket to facilitate the insertion of a stanchion swivel and permit the head thereof to rest in one of said sockets, a removable locking bar passing longitudinally through said bracket so as to be disposed over the sockets therein, and a head on said locking bar, said head having a rear recessed portion.

5. In supporting means for stanchions, the combination of a hollow bracket provided therein with a row of sockets and having lateral slots and openings for the insertion of a stanchion swivel to have its head seated in any one of said sockets, a removable locking bar passing through said bracket so as to be disposed over the sockets therein, and means for securing said locking bar in place.

In testimony whereof, I have signed this specification in the presence of a subscribing witness.

HUGO C. RASSMANN.

Witness:
A. B. CHANDLER.